(12) United States Patent
Takeuchi

(10) Patent No.: US 11,341,673 B2
(45) Date of Patent: May 24, 2022

(54) INFRARED IMAGE PROCESSING METHOD, INFRARED IMAGE PROCESSING DEVICE, AND INFRARED IMAGE PROCESSING PROGRAM

(71) Applicant: Topcon Corporation, Tokyo (JP)

(72) Inventor: Gaku Takeuchi, Tokyo (JP)

(73) Assignee: Topcon Corporation, Tokyo (JP)

( * ) Notice: Subject to any disclaimer, the term of this patent is extended or adjusted under 35 U.S.C. 154(b) by 243 days.

(21) Appl. No.: 16/850,702

(22) Filed: Apr. 16, 2020

(65) Prior Publication Data

US 2020/0342622 A1 Oct. 29, 2020

(30) Foreign Application Priority Data

Apr. 24, 2019 (JP) .............................. JP2019-083000

(51) Int. Cl.
*G06V 10/143* (2022.01)
*G06V 10/147* (2022.01)
(Continued)

(52) U.S. Cl.
CPC .............. *G06T 7/73* (2017.01); *G06V 10/143* (2022.01); *G06V 10/147* (2022.01); *G06V 20/13* (2022.01);
(Continued)

(58) Field of Classification Search
None
See application file for complete search history.

(56) References Cited

U.S. PATENT DOCUMENTS 6,608,672 B1 8/2003 Shibusawa et al.
7,861,423 B2 1/2011 Kumagai et al.
(Continued)

FOREIGN PATENT DOCUMENTS

JP 3906326 B2 4/2007
JP 2009-229192 A 10/2009
(Continued)

OTHER PUBLICATIONS

Khithov et al., "Towards Autonomous UAV Landing based on Infrared Beacons and Particle Filtering," Proceedings of the 12th International Conference on Genetic and Evolutionary Computing, Jul. 9, 2016, vol. 447, XP0557233300, pp. 529-537.
(Continued)

*Primary Examiner* — Idowu O Osifade
(74) *Attorney, Agent, or Firm* — Chiesa Shahinian & Giantomasi PC

(57) ABSTRACT

In measurement using infrared images that are obtained by nighttime aerial photography, a correspondence relationship between the infrared images is determined with high accuracy by the following method. In this method, agricultural land is photographed from the air at night by using an infrared camera mounted on a UAV. In the state in which multiple infrared light emitting points are installed on agricultural land, the agricultural land is photographed multiple times by the infrared camera while the UAV flies at night in such a manner that a part of the agricultural land is commonly contained in multiple infrared photographic images. Then, a correspondence relationship between the multiple infrared photographic images is determined by using bright points of the infrared light emitting points in the part of the agricultural land commonly contained in the infrared photographic images.

6 Claims, 4 Drawing Sheets

(51) Int. Cl.
*G06V 20/13* (2022.01)
*G06T 7/73* (2017.01)

(52) U.S. Cl.
CPC ............... *G06T 2207/10048* (2013.01); *G06T 2207/30204* (2013.01)

(56) References Cited

U.S. PATENT DOCUMENTS

| | | | |
|---|---|---|---|
| 10,223,805 B1 | 3/2019 | Trail | |
| 2009/0235541 A1 | 9/2009 | Kumagai et al. | |
| 2011/0137498 A1* | 6/2011 | Suzuki | G03B 37/04 |
| | | | 701/4 |
| 2012/0242830 A1 | 9/2012 | Kumagai et al. | |
| 2013/0135440 A1 | 5/2013 | Ohtomo et al. | |
| 2013/0236107 A1 | 9/2013 | Fukaya et al. | |
| 2015/0051758 A1* | 2/2015 | Cho | G05D 1/0676 |
| | | | 701/16 |
| 2016/0214715 A1* | 7/2016 | Meffert | G01W 1/00 |
| 2017/0185849 A1* | 6/2017 | High | G06V 20/64 |
| 2018/0239368 A1 | 8/2018 | Nishita | |
| 2019/0073794 A1 | 3/2019 | Sasaki et al. | |

FOREIGN PATENT DOCUMENTS

| | | |
|---|---|---|
| JP | 2012-202821 A | 10/2012 |
| JP | 5124319 B2 | 1/2013 |
| JP | 2013-178656 A | 9/2013 |
| JP | 2013-186816 A | 9/2013 |
| JP | 2018-136205 A | 8/2018 |
| JP | 2019-045425 A | 3/2019 |
| JP | 2019-138842 A | 8/2019 |
| WO | 2017156040 A1 | 9/2017 |
| WO | 2019071569 A1 | 4/2019 |

OTHER PUBLICATIONS

European Extended Search Report dated Aug. 27, 2020, in connection with European Patent Application No. 20169928.7, 12 pgs.

* cited by examiner

INFRARED IMAGE PROCESSING METHOD, INFRARED IMAGE PROCESSING DEVICE, AND INFRARED IMAGE PROCESSING PROGRAM

CROSS-REFERENCE TO RELATED APPLICATIONS

This application claims the benefit of priority from Japanese Patent Application Serial No. 2019-083000, filed Apr. 24, 2019, the disclosure of which is incorporated herein by reference in its entirety.

TECHNICAL FIELD

The present disclosure relates to a technique for night aerial surveying.

BACKGROUND

A technique for quantitatively determining fertility of soil of agricultural land by an optical method is publicly known (for example, refer to Japanese Patent No. 3906326). The temperature of soil is a critical factor in raising agricultural products. Distribution of the temperature of the soil normally differs between the daytime and the nighttime. It is widely known that there is a large effect of difference in soil temperatures between daytime and nighttime on yield and quality of agricultural crops.

Aerial measurement of soil conditions is convenient. This technique can be performed by using an unmanned aerial vehicle (UAV). The UAV takes photographs of agricultural land, and the photographed images are analyzed.

To measure the temperature of soil in aerial photography by the use of an UAV, the soil is photographed using an infrared camera. This technique requires determining a relationship between temperature and location on the ground surface and therefore involves determination of location of an object contained in an image by use of a method similar to aerial photogrammetry.

In this technique, registration is performed to determine a correspondence relationship between still images that are adjacent or close to each other on the time axis, and location of a ground surface contained in the image is calculated by a method of intersection or resection. For this reason, accuracy of the registration is important to maintain satisfactory accuracy of resulting data. Daytime aerial photography can yield visible images. With the use of the visual images, registration can be performed such that feature points are extracted from each of the visible images to obtain point clouds and correspondence relationships between the point clouds are examined.

On the other hand, nighttime photography does not yield a visible image, and thus, it is difficult to perform registration between still images, unlike in the case of daytime photography. Nighttime photography can provide infrared images, but these images tend to not contain prominent edges because temperature distribution in soil is normally on a gradient. This causes accuracy of registration using feature points to be less than that in the case of daytime photography.

SUMMARY

In view of these circumstances, an object of the present disclosure is to provide a technique for determining correspondence relationships between infrared images, with high accuracy, in measurement using infrared images that are obtained by night aerial photography.

The present disclosure provides a method for processing infrared photographic images in a technique of photographing a ground surface from the air at night by using an infrared camera mounted on a UAV. The method includes disposing multiple infrared light emitting points on the ground surface, and photographing the ground surface multiple times in such a manner as to obtain multiple infrared photographic images in which a part of the ground surface is commonly contained, by using the infrared camera while the UAV flies at night. The method also includes determining correspondence relationships between the multiple infrared photographic images by using bright points of the infrared light emitting points in the part of the ground surface commonly contained in the multiple infrared photographic images.

In the present disclosure, the multiple infrared light emitting points may include an infrared light emitting point having an emission wavelength that is different from the emission wavelength of other infrared light emitting points. In this case, location of at least one of the multiple infrared light emitting points may be determined in advance. The infrared light emitting point in which the location is determined in advance and an infrared light emitting point in which the location is not determined in advance may be distinguished from each other in accordance with differences in emission wavelength. Moreover, in the present disclosure, the multiple infrared light emitting points may include an infrared light emitting point having an emission wavelength of $\lambda i$ (i=1, 2, 3, . . . ). In this case, the relationship between the emission wavelength $\lambda i$ and location at which infrared light having the emission wavelength $\lambda i$ is emitted from the infrared light emitting point may be preliminarily determined. In a case in which the infrared light emitting point having the emission wavelength $\lambda i$ is detected in the infrared photographic image, location of the detected infrared light emitting point may be identified on a basis of the preliminarily determined relationship.

The present disclosure also provides a device for processing infrared photographic images, and the device includes a processor or circuitry configured to store data of an emission wavelength of a marker that emits infrared light having a specific wavelength and data of location at which the marker is installed in a surveying target. The processor or the circuitry is further configured to receive data of at least a pair of infrared photographic images that are obtained in such a manner that at least a part of the surveying target is photographed from different positions so as to be contained in both of the infrared photographic images. The processor or the circuitry is further configured to extract multiple feature points, including a light emitting point of the marker, from at least the pair of the infrared photographic images. The processor or the circuitry is yet further configured to detect the light emitting point of the infrared light having a specific wavelength, from among the multiple feature points and to acquire the location of the light emitting point of the infrared light having the specific wavelength, from the stored data, on the basis of the emission wavelength of the light emitting point that is detected.

The present disclosure also provides a method for processing infrared photographic images, and the method includes storing data of an emission wavelength of a marker that emits infrared light having a specific wavelength and data of the location at which the marker is installed at a surveying target. The method also includes receiving data of at least a pair of infrared photographic images that are obtained in such a manner that at least a part of the surveying target is photographed from different positions so as to be commonly contained in both of the infrared photographic images. The method also includes extracting multiple feature points including a light emitting point of the marker, from at least the pair of the infrared photographic images. The method further includes detecting the light emitting point of the infrared light having the specific wavelength, from among the multiple feature points and includes acquiring location of the light emitting point of the infrared light having the specific wavelength, from the stored data, on a basis of the emission wavelength of the light emitting point that is detected.

The present disclosure further provides a non-transitory computer recording medium storing computer executable instructions for processing infrared photographic images. The computer executable instructions are made to, when executed by a computer processor, cause the computer processor to store data of an emission wavelength of a marker that emits infrared light having a specific wavelength and data of the location at which the marker is installed in a surveying target. The computer executable instructions are made to, when executed by the computer processor, also cause the computer processor to receive data of at least a pair of infrared photographic images that are obtained in such a manner that at least a part of the surveying target is photographed from different positions so as to be contained in both of the infrared photographic images. The computer executable instructions are made to, when executed by the computer processor, also cause the computer processor to extract multiple feature points including a light emitting point of the marker, from at least the pair of the infrared photographic images, detect the light emitting point of the infrared light having the specific wavelength, from among the multiple feature points, and acquire location of the light emitting point of the infrared light having the specific wavelength, from the stored data, on the basis of the emission wavelength of the light emitting point that is detected.

The present disclosure enables highly accurate determination of a correspondence relationship between infrared images, in measurement using the infrared images that are obtained by night aerial photographing.

DETAILED DESCRIPTION

1. First Embodiment

Outline

Agricultural land 500 is photographed from the air at night by using an infrared camera 101 that is mounted on a UAV 100. At least one infrared light emitting point (for example, a point $P_j$) is installed on the agricultural land 500. In this state, while the UAV 100 flies at night, the infrared camera 101, which is mounted on the UAV 100, photographs multiple times in such a manner that a part of the agricultural land 500 is commonly contained in multiple infrared photographic images. Then, a correspondence relationship between the multiple infrared photographic images is determined by using feature points, including the infrared light emitting point, in the part of the agricultural land 500 contained in the infrared photographic images. A bright point of the at least one infrared light emitting point is used as the feature point.

Figure 1:
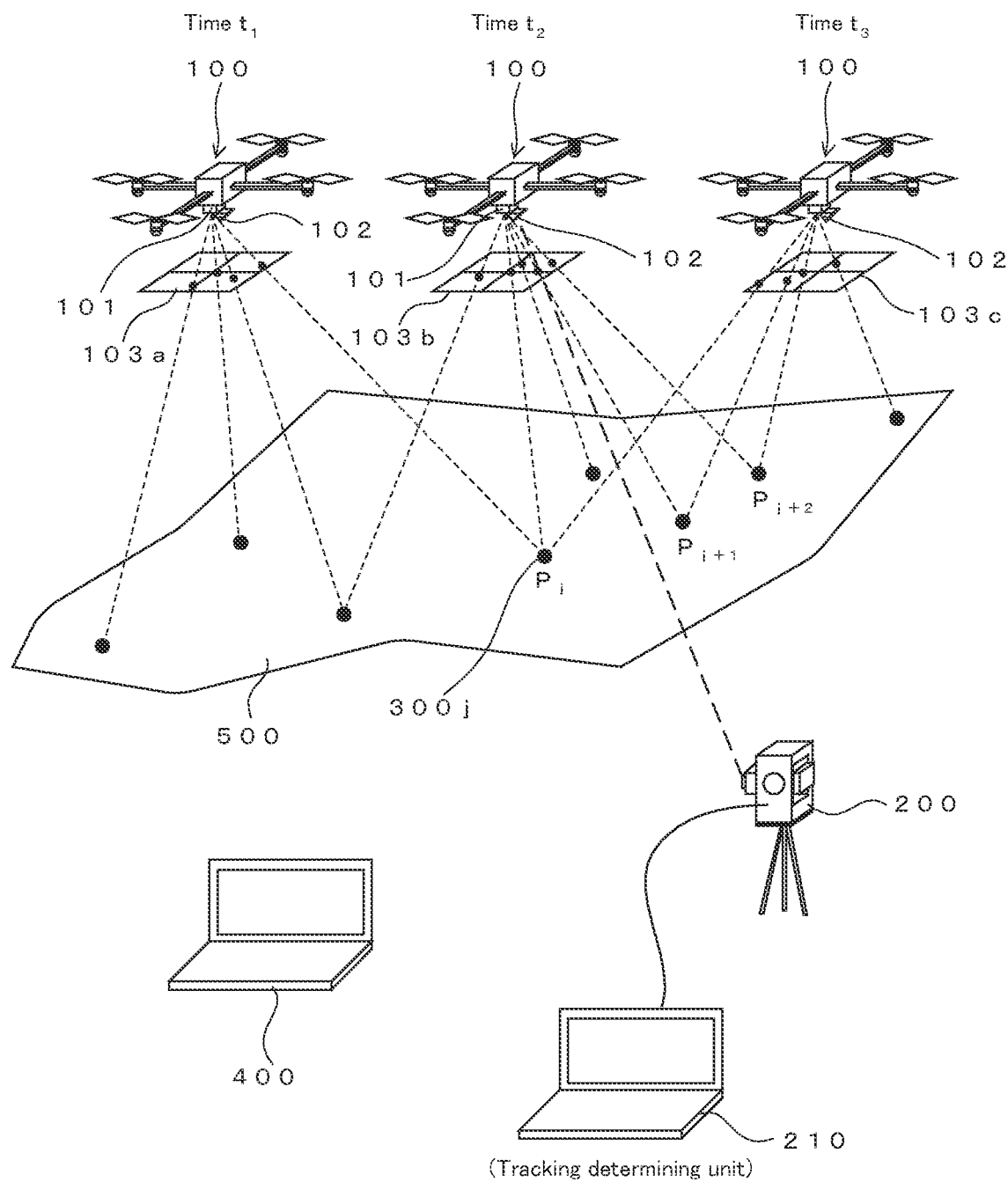
FIG. 1 is a principle diagram showing an outline of an embodiment.

FIG. 1 shows an example of a case of continuously taking infrared photographs of the agricultural land 500 by using the UAV 100 at night. The UAV 100 continuously takes infrared photographs of the agricultural land 500 at a predetermined interval while it is flying. In the example shown in FIG. 1, the UAV 100 takes infrared photographs of images 103a, 103b, and 103c by performing photographing at different times $t_1$, $t_2$, and $t_3$ during movement in the air.

A large number of infrared images is obtained by photographing during flight. The photographed areas in the infrared images slightly differ from each other on the time axis due to movement of position of a viewpoint or a photographing position as time elapses. The photographing conditions such as a photographing interval and flight speed are set in such a manner that multiple images adjacent or close to each other on the time axis partially contain the same object. In the example shown in FIG. 1, the images 103a, 103b, and 103c partially overlap.

Although a case of performing nighttime photography on the agricultural land (field) 500 is described herein, of course, daytime photography is also performed in a similar manner in order to measure temperature distribution of the agricultural land 500 in the daytime. A PC 400 is used to analyze infrared photographic images, whereby a temperature distribution of a ground surface is determined. The location of each point that is contained in the image is calculated by surveying calculation using a method of intersection or resection, which will be described later. As a result, relationships between location on the agricultural land and the ground surface temperature are obtained.

In the case of nighttime photography, the number of features in the image or the infrared image is small, and thus, extraction of feature points may be difficult, and calculation of location of each point on a ground surface, from extracted feature points, may be difficult or may be performed with low accuracy by using a method of intersection or resection. In view of this, markers or landmarks that respectively include an infrared light emitting point for emitting infrared light are installed at multiple points on a ground surface. These markers are extracted as feature points in order to determine location of each point on the ground surface by using infrared photographs taken at night.

The location of at least one of the markers may be measured or determined by a total station (TS) or other apparatus, as preparation. This increases final accuracy of resultant data. A reflection prism 102 may be mounted on the UAV 100 and may be tracked by a TS 200, whereby location may be determined in real time during flight. This also increases final accuracy of resultant data.

Data is analyzed in post-processing by the PC 400 after the flight is completed. That is, first, the UAV 100 takes infrared still images of a ground surface during a night flight. For example, the photographing is performed at an interval of 2 seconds. As a result, a large number of still images is obtained. The image data and the flight logs are collected after the flight of the UAV 100 is completed. These data are analyzed by using the PC 400, whereby a soil temperature distribution map is generated.

The location of the UAV 100 or the infrared camera 101 at the time each photographic image is obtained is measured by a GNSS location identifying unit mounted on the UAV 100 or by the TS 200. The attitude of the UAV 100 or the infrared camera 101 at the time each photographic image is obtained is measured by an inertial measurement unit (IMU) mounted on the UAV 100.

The image data, the location data, and the attitude data may be sent from the UAV 100 that is flying, to the PC 400, and processing relating to generation of a soil temperature distribution map may be performed during flight of the UAV 100. In the case of using the TS 200, location data of the UAV 100 is measured by the TS 200 and is sent from the TS 200.

The TS 200 is connected to a PC 210 that functions as a tracking determining unit. The PC 210 determines whether the TS 200 tracks and monitors the UAV 100 that is flying at night. The function of the PC 210 can be implemented by using a tablet, a smartphone, or other device. The function of the tracking determining unit may be incorporated in the TS 200. The tracking determining unit can also be considered as a circuit, a processor, or a computer program for performing determination of tracking of the UAV 100 that is flying at night. Details of the determination of tracking will be described later.

Details of Embodiment

UAV

The UAV 100 is configured by mounting the infrared camera 101, the reflection prism 102, a GNSS location identifying unit (not shown), and the IMU (not shown) to a commercially available UAV. The positional relationships and the directional relationships of the infrared camera 101, the reflection prism 102, the GNSS location identifying unit, and the IMU, relative to the UAV 100, are obtained in advance. An ordinary camera (not shown) for obtaining a photograph of a visible image is also mounted on the UAV 100.

The infrared camera 101 obtains a thermal image based on a principle of infrared thermography. The infrared camera 101 continuously obtains infrared still images at a predetermined interval by photographing. The photographing interval is adjusted in such a manner that photographed objects in images gradually vary and partially have the same part. An appropriate photographing interval is determined by flight speed and flight altitude of the UAV 100 in photographing as well as a view angle of the infrared camera 101 and is thus set in consideration of these factors. In one example, moving image photographing may be performed, and frame images composing the moving image may be used.

The reflection prism 102 reflects incident rays by 180 degrees. The reflection prism 102 is embodied by using a commercially available surveying reflection prism. In the state in which the position and attitude of the infrared camera 101 in the UAV 100 and the positional relationship of the reflection prism 102 in the UAV 100 are already known, the TS 200 positions the reflection prism 102. This determines the location of the reflection prism 102 and the location of the optical origin of the infrared camera 101. The optical origin of the infrared camera 101 is a viewpoint or a projection center. The TS 200 measures the location of the reflection prism 102 in real time, thereby positioning and tracking the UAV 100 in real time.

Details of a TS are disclosed in, for example, Japanese Unexamined Patent Applications Laid-Open Nos. 2009-229192 and 2012-202821. The method of tracking the reflection prism 102 by the TS 200 is disclosed in, for example, Japanese Patent No. 5124319. In addition, tracking of a UAV by a TS is disclosed in, for example, Japanese Patent Application No. 2017-30898.

The TS 200 and the infrared camera 101 of the UAV 100 respectively have clocks that are synchronized, and therefore, the correspondence relationship of time information between the TS 200 and the infrared camera 101 of the UAV 100 is known. For example, this can be implemented by using a synchronous signal from a navigation satellite of the GNSS location identifying unit as the time information.

Agricultural Land

Any agricultural land can be used as the agricultural land 500 regardless of presence or absence of crops and kinds of crops. Multiple markers are installed in the agricultural land 500. The number of the markers can be one, at least, but a greater number is preferable, if possible. Additionally, the markers are preferably installed in a distributed manner. The marker functions as a light emitting point or a bright point that emits infrared light, and the marker is extracted as a feature point from an infrared image.

Marker

Figure 2:
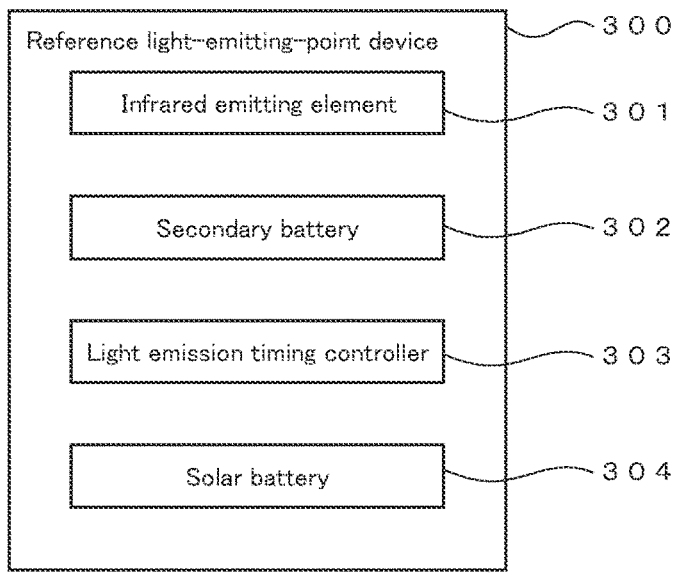
FIG. 2 is a block diagram of a reference light-emitting-point device of the embodiment.

FIG. 2 shows a reference light-emitting-point device 300 as an example of the marker. The reference light-emitting-point device 300 includes an infrared emitting element 301, a secondary battery 302, a light emission timing controller 303, and a solar battery 304.

The infrared emitting element 301 is an LED that emits light in an infrared region. In order to make it easy to perform registration, that is, determination of a correspondence relationship, between infrared images, multiple LEDs having emission wavelengths different from each other are used as the infrared emitting element, herein. The secondary battery 302 is a battery that is a power source during the nighttime and uses an electric double-layer capacitor or a publicly known chargeable battery of each type. The light emission timing controller 303 controls to make the infrared emitting element 301 emit light at a predetermined time. For example, the infrared emitting element 301 may be made to emit light from 9 p.m. to 10 p.m. The solar battery 304 generates electric power by using solar power and charges the secondary battery 302 with the electric power, during the daytime.

As preparation for nighttime photography, multiple reference light-emitting-point devices 300, as shown in FIG. 2, are preliminarily installed on target agricultural land or target field, as markers. Location of at least one of the markers is measured and is determined in advance. The markers in which the locations are determined are made to have emission wavelengths different from the emission wavelengths of the other markers in which the locations are not determined, in order to optically distinguish them from each other.

For example, it is assumed that $\lambda_0$, $\lambda_1$, $\lambda_2$, and $\lambda_3$ represent wavelengths in the infrared region, and $\lambda_0 \neq \lambda_1 \neq \lambda_2 \neq \lambda_3$. In addition, it is also assumed that multiple markers, for which the locations are not determined, have an emission wavelength of $\lambda_0$. A marker having an emission wavelength of $\lambda_1$ is disposed at a preliminarily determined location $P_1$, a marker having an emission wavelength of $\lambda_2$ is disposed at a preliminarily determined location $P_2$, and a marker having an emission wavelength of $\lambda_3$ is disposed at a preliminarily determined location $P_3$.

In a case in which the location at which the marker is to be installed is limited due to, for example, crops planted on the agricultural land, markers may be disposed at an edge or a ridge of a field. In addition, markers may be disposed at some height above the ground surface, e.g. at a height of approximately several tens of centimeters to approximately one meter, by using a pole or other object.

Data Processor

FIG. 1 describes the PC 400 for processing data. The PC 400 is a general-purpose device and includes a CPU, a storage, an input-output interface, a hard disk drive, operation interfaces such as a GUI, and a liquid crystal display unit. This configuration also applies to the other PC 210.

Figure 3:
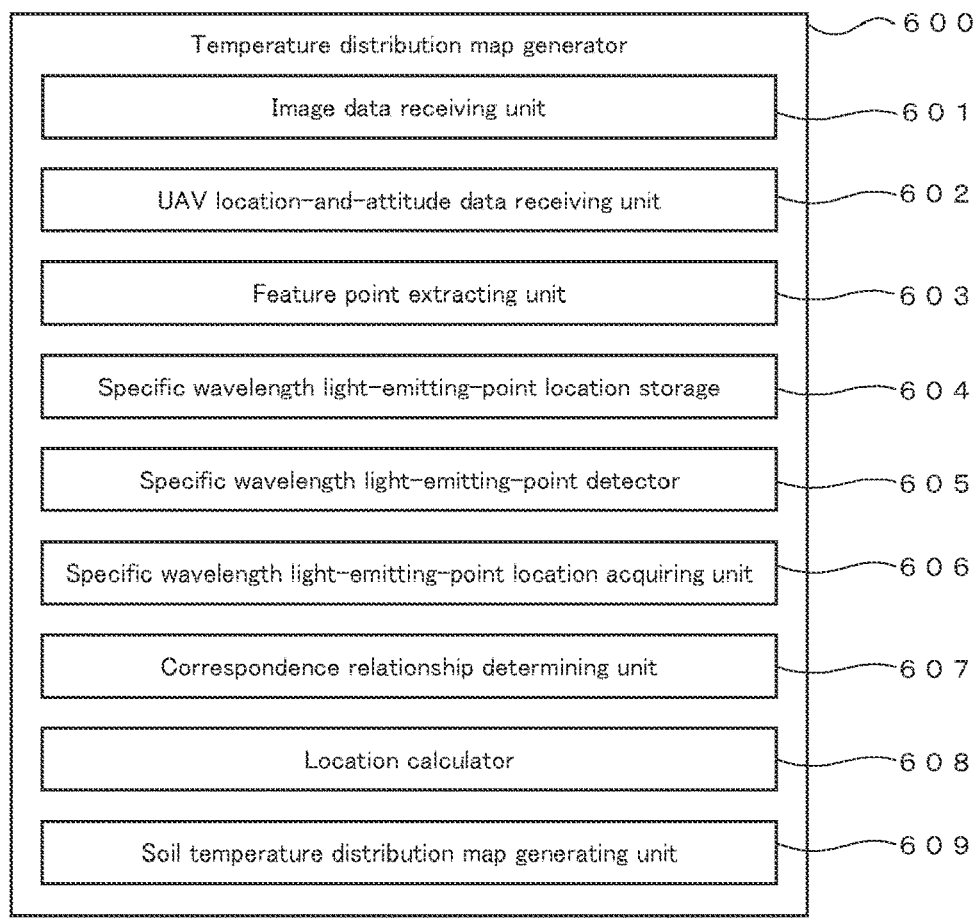
FIG. 3 is a block diagram of a temperature distribution map generator of the embodiment.
Figure 4:
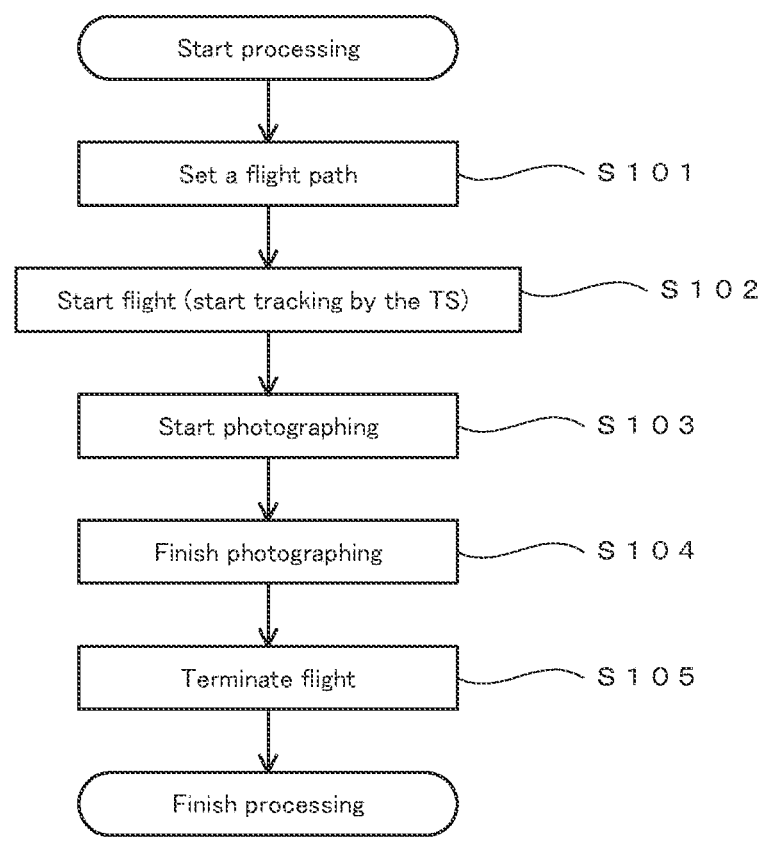
FIG. 4 is a flowchart showing an example of a processing procedure of the embodiment.
Figure 5:
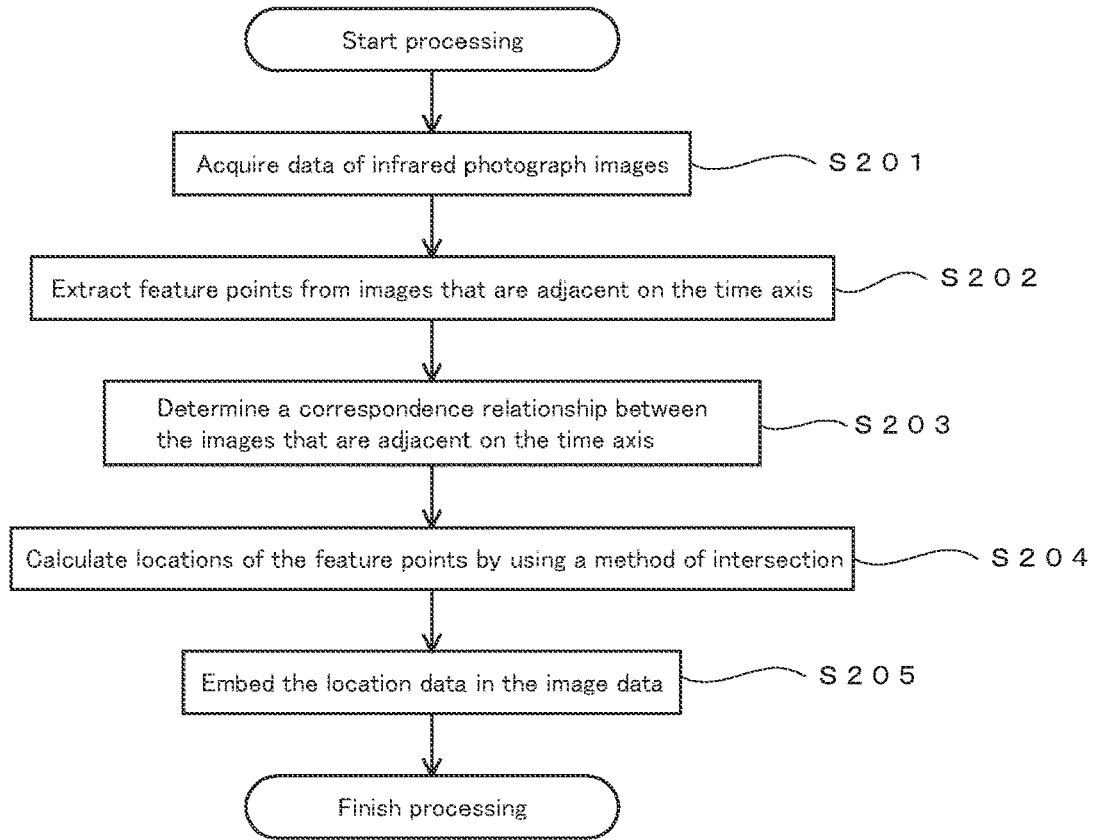
FIG. 5 is a flowchart showing an example of a processing procedure of the embodiment.

The PC 400 provides a temperature distribution map generator 600 shown in FIG. 3. The temperature distribution map generator 600 includes an image data receiving unit 601, a UAV location-and-attitude data receiving unit 602, a feature point extracting unit 603, a specific wavelength light-emitting-point location storage 604, a specific wavelength light-emitting-point detector 605, a specific wavelength light-emitting-point location acquiring unit 606, a correspondence relationship determining unit 607, a location calculator 608, and a soil temperature distribution map generating unit 609. These functional parts are implemented by installing application software for implementing these functional parts, in the PC 400.

Each of the functional parts shown in FIG. 3 can be considered as an electronic circuit, a processor, or a program for implementing a corresponding function. Of course, dedicated hardware for implementing some or all of the components shown in FIG. 3 may be prepared.

Alternatively, the PC 400 may be used as a user interface, and some or all of the components of the temperature distribution map generator 600 may be embodied by a server that is connected to the PC 400 via a line. Programs for implementing the temperature distribution map generator 600 are stored in an appropriate storage medium and are provided therefrom.

The image data receiving unit 601 receives data of infrared images that are obtained such that the UAV 100 photographs a ground surface while flying at night. This data of the infrared images are associated with corresponding photographing times.

The UAV location-and-attitude data receiving unit 602 receives data of location and attitude of the UAV 100 or the infrared camera 101 at a photographing time of each of the photographic images of the data received by the image data receiving unit 601. The location of the UAV 100 or the infrared camera 101 is determined in positioning performed by the GNSS location identifying unit of the UAV 100 and/or in laser positioning performed by a total station (TS) 200.

The feature point extracting unit 603 extracts feature points from the infrared image. The extraction of feature points is performed by using a differential filter that is constructed by software. Each type of software for extracting feature points has been developed and is commercially available.

In this embodiment, an image to be used is an infrared image, which contains feature points at a number less than that in an ordinary image in a visible light region. In consideration of this, in this embodiment, multiple markers ($P_j$, $P_{j+1}$, $P_{j+2}$, ...) that emit infrared light are used in order to cover the small number of extracted feature points.

The specific wavelength light-emitting-point location storage 604 stores data of infrared light wavelengths and locations of markers in which the locations are preliminarily determined. For example, in the case of using three markers having different infrared wavelengths $\lambda_1$, $\lambda_2$, and $\lambda_3$ respectively installed at locations $P_1$, $P_2$, and $P_3$, data of ($\lambda_1$, $P_1$), ($\lambda_2$, $P_2$), and ($\lambda_3$, $P_3$) are stored in the specific wavelength light-emitting-point location storage 604. The specific wavelength light-emitting-point detector 605 detects a feature point having a specific infrared wavelength from among the extracted feature points. In the case of the above-described example, a wavelength to be selected may be $\lambda_2$. In this situation, a bright point having a wavelength of $\lambda_2$ is detected.

The specific wavelength light-emitting-point location acquiring unit 606 retrieves and acquires the location of the feature point or the marker that emits the specific wavelength light, which is extracted by the specific wavelength light-emitting-point detector 605, from the specific wavelength light-emitting-point location storage 604. For example, in the state in which the data of ($\lambda_1$, $P_1$), ($\lambda_2$, $P_2$), and ($\lambda_3$, $P_3$) are stored in the specific wavelength light-emitting-point location storage 604, a feature point or a marker having a wavelength of $\lambda_2$ may be extracted by the specific wavelength light-emitting-point detector 605. This results in acquisition of the location $P_2$ as the location of the extracted feature point. This process is performed by the specific wavelength light-emitting-point location acquiring unit 606.

The correspondence relationship determining unit 607 determines a corresponding relationship of feature points between multiple infrared images. This process is performed by using template matching. The technique for determining a correspondence relationship of feature points is also disclosed in, for example, Japanese Unexamined Patent Applications Laid-Open Nos. 2013-178656 and 2013-186816.

The location calculator 608 calculates a three-dimensional location (longitude, latitude, and elevation) of the feature point or the marker, which is extracted from the infrared image, by using a method of intersection. Conversely, the location calculator 608 calculates the location of the UAV 100 or the infrared camera 101 from the location of the feature point by use of a method of resection. The principles of calculations of these locations will be described later.

Figure 6:
FIG. 6 is an example of a soil temperature distribution map.

The soil temperature distribution map generating unit 609 generates a temperature distribution map of soil of the photographed agricultural land. FIG. 6 shows an example of a soil temperature distribution map. This map is generated based on data of temperature of soil and data of a relationship of the temperature and location of the soil. The map visually shows temperature distribution by difference in color, in gray scale, or in another manner. The temperature distribution map shown in FIG. 6 shows binarized temperature distribution. In this case, the black colored part shows soil having a ground surface temperature of 28° C. or higher, and the white space shows soil having a ground surface temperature of less than 28° C. Although a binarized temperature distribution map is exemplified in FIG. 6, temperature distribution can also be represented in gray scale or difference in color, in 16 levels (values) or 256 levels (values), or in another manner.

Method of Calculating Location of Point on Ground Surface Contained in Infrared Image On the condition that a correspondence relationship between images and location of the UAV 100 at each time are determined, location of a feature point $P_j$ on a ground surface can be calculated by a method of intersection. As an example of this embodiment, assuming that location of the feature point $P_j$ is unknown, a method of calculating the location of the feature point $P_j$ is described.

In this example, a directional line connecting the position of the point $P_j$ in an infrared image 103a, which is a screen position, and the location of the UAV 100 at time $t_1$ is set. The positional relationship between the infrared camera 101 and the reflection prism 102 in the UAV 100 is already known. The viewpoint or the projection center of the infrared camera 101 is used as the location of the UAV 100, herein.

In a similar manner, a directional line connecting the position of the point $P_j$ in an infrared image 103b, which is a screen position, and the position of the UAV 100 at time $t_2$ is set. Also, in a similar manner, a directional line connecting the position of the point $P_j$ in an infrared image 103c, which is a screen position, and the location of the UAV 100 at time $t_3$ is set.

The locations of the UAV 100 at each of the times $t_1$, $t_2$, and $t_3$ are already known, and thus, coordinate values of an intersection point $P_j$ at which the three directional lines intersect each other are calculated. On the basis of this principle, location of each feature point on the photographed ground surface is calculated. Details of the calculation of location of a feature point extracted from a stereoscopic image are disclosed in, for example, Japanese Unexamined Patent Application Laid-Open No. 2013-186816 and Japanese Patent Applications Nos. 2017-171289 and 2018-24136.

Method of Calculating Location of UAV that Flies

Conversely, on the condition that a correspondence relationship between images and coordinate values of a point $P_j$, $P_{j+1}$, and $P_{j+2}$ on the ground surface are already known, location of the UAV 100 at photographing time $t_n$ can be calculated by a method of resection. The following briefly describes principle of this calculation. In this case, a directional line connecting the position of the point $P_j$ in the infrared image 103b, which is a screen position, and the point $P_j$ on the ground surface, is set. In a similar manner, a directional line connecting the position of the point $P_{j+1}$ in the infrared image 103b, which is a screen position, and the point $P_{j+1}$ on the ground surface, is set. Also, in a similar manner, a directional line connecting the position of the point $P_{j+2}$ in the infrared image 103b, which is a screen position, and the point $P_{j+2}$ on the ground surface, is set.

The coordinate values of the points $P_j$, $P_{j+1}$, and $P_{j+2}$ are already known, and thus, location of an intersection point of these three directional lines is calculated as location of the UAV 100 at time $t_2$, or more exactly, location of the viewpoint or the projection center of the infrared camera 101. Details of the calculation using a method of resection are disclosed in, for example, Japanese Unexamined Patent Application Laid-Open No. 2013-186816.

Example of Processing

The following describes an example of processing. First, the UAV 100 is made to fly at night, and infrared photography of a target agricultural land is performed. The following four kinds of markers are preliminarily installed on the agricultural land 500 to be photographed at night.

In this example, four kinds of markers having emission wavelengths $\lambda_0$, $\lambda_1$, $\lambda_2$, and $\lambda_3$ are used. The symbols $\lambda_0$, $\lambda_1$, $\lambda_2$, and $\lambda_3$ represent wavelengths in the infrared region, and $\lambda_0 \neq \lambda_1 \neq \lambda_2 \neq \lambda_3$. Multiple markers having the emission wavelength of $\lambda_0$ are installed at locations that are not determined. The marker having the emission wavelength of $\lambda_1$ is disposed at a preliminarily determined location $P_1$, the marker having the emission wavelength of $\lambda_2$ is disposed at a preliminarily determined location $P_2$, and the marker having the emission wavelength of $\lambda_3$ is disposed at a preliminarily determined location $P_3$. Data of $(\lambda_1, P_1)$, $(\lambda_2, P_2)$, and $(\lambda_3, P_3)$ are stored in the specific wavelength light-emitting-point location storage 604.

Processing Relating to Photographing

As preparation, infrared photographing of the agricultural land 500 is performed in the daytime. In these conditions, first, a flight path for a flight at night is set (step S101). Normally, the UAV 100 stores the path along which the UAV 100 flies before, and the UAV 100 can be made to fly along the previous path. This function is used to set the path along which the UAV 100 flies in the daytime, as the path for flight at night.

Next, the UAV 100 is made to start flying at night (step S102), and aerial infrared photographing is started in the air above the target agricultural land 500 (step S103). After the UAV 100 flies through the path that is planned for photographing, photographing is stopped (step S104), and then the flight is terminated (step S105).

Example of Processing Data

First, image data of infrared photographic images obtained by photographing from the UAV 100 and the flight logs are collected, and these pieces of information are received by the image data receiving unit 601 (step S201). The flight logs contain photographing time of each image, location data, and attitude data. The location data is measured by the GNSS location identifying unit and is associated with the photographing time. The attitude data is measured by the IMU.

In step S201, location data of the UAV 100 or the reflection prism 102, which is measured by the TS 200, is also received by the image data receiving unit 601.

Next, data of images that are adjacent on the time axis is selected from the acquired image data. Two images that are adjacent on the time axis constitute a stereoscopic image. As the stereoscopic images, a large number of pairs, e.g. a pair of an nth image and an n+1th image, a pair of an n+1th image and an n+2th image, and a pair of an n+3th image and an n+4th image, are selected.

After stereoscopic images are selected, feature points are extracted from the selected pair of two images (step S202). This process is performed for every stereoscopic image. This process is performed by the feature point extracting unit 603. The feature points that are extracted in this step include a bright point of infrared light that is emitted from the marker. The selected images may not be adjacent on the time axis but may be close to each other on the time axis on the condition that the selected images partially contain the same object.

The extracted feature points include bright points of the three markers having the wavelengths $\lambda_1$, $\lambda_2$, and $\lambda_3$, which are installed while the locations are preliminarily determined. These bright points are detected by the specific wavelength light-emitting point detector 605. The data $(\lambda_1, P_1)$, $(\lambda_2, P_2)$, and $(\lambda_3, P_3)$ are stored in the specific wavelength light-emitting-point location storage 604. Thus, after the bright points of the markers having the wavelengths $\lambda_1$, $\lambda_2$, and $\lambda_3$ are detected in the images, locations, that is, three-dimensional locations in an absolute coordinate system, are determined. The three-dimensional location in the absolute coordinate system is represented by latitude, longitude, and elevation, for example.

Thereafter, the extracted feature points are used to determine a correspondence relationship between the images constituting the stereoscopic image (step S203). This process is performed by the correspondence relationship determining unit 607.

In determining the correspondence relationship of feature points between the images constituting the stereoscopic image, efficiency and accuracy of matching can be increased in some pairs of the images of the stereoscopic images because the bright points of the three markers having the wavelengths $\lambda_1$, $\lambda_2$, and $\lambda_3$ are identified.

Then, location of a feature point, in which a correspondence relationship between the images constituting the stereoscopic image is determined, is calculated based on the images constituting the stereoscopic image, by a method of intersection (step S204). This calculation is not performed to the markers in which the locations are already known. This process is performed by the location calculator 608.

Although a case of selecting two images that are adjacent on the time axis as a stereoscopic image is described for explanation of the principles herein, three or more images that partially contain the same sites are used in the calculation using a method of intersection, in actual processing.

In the example shown in FIG. 1, assuming that the feature point $P_j$ is a feature point in which location is not known, the following three directional lines 1 to 3 are set. The directional line 1 connects an optical origin $O_1$ of the infrared camera 101 at time $t_1$ and an image coordinate point of the feature point $P_j$ in the image 103a. The directional line 2 connects an optical origin $O_2$ of the infrared camera 101 at time $t_2$ and an image coordinate point of the feature point $P_j$ in the image 103b. The directional line 3 connects an optical origin $O_3$ of the infrared camera 101 at time $t_3$ and an image coordinate point of the feature point $P_j$ in the image 103c. The optical origin of the infrared camera 101 is a viewpoint or a projection center. The optical origins $O_1$, $O_2$, and $O_3$ of the infrared camera 101 are already known because the TS 200 measures the reflection prism 102, and thus, location or coordinates of the intersection point $P_j$ of the directional lines 1, 2, and 3 are calculated. This process is performed by the location calculator 608.

In this process, a three-dimensional model is generated by using multiple feature points and the optical origin, which a viewpoint or a projection center, of the infrared camera 101 at each time, and the location of the optical origin is determined by the TS 200 to provide a scale to the three-dimensional model. As a result, a three-dimensional model in an absolute coordinate system is provided, and coordinates of each feature point are determined. At this time, the locations or the coordinates in the absolute coordinate system of at least the three points $P_1$, $P_2$, and $P_3$ on the ground surface are provided, and these points function as constraint points, thereby increasing accuracy of the obtained three-dimensional model.

After step S204 is performed, infrared images, each which is obtained by photographing at each time, are stitched together, and image processing is performed on the stitched together image in order to enhance ease of viewing thermal distributions, whereby a map image showing soil temperature distribution is generated. Moreover, location information of the feature points, which is calculated in step S204, is embedded in the map image, whereby a nighttime soil temperature distribution map that is embedded with the location information is generated (step S205). This process is performed by the soil temperature distribution map generating unit 609.

2. Second Embodiment

The following describes a case of not performing tracking of the UAV 100 by the TS 200. This technique can also be used when the TS 200 fails in tracking the UAV 100 that is flying.

In this case, locations of multiple markers are preliminarily measured, and data of the locations is obtained in advance. First, infrared images are obtained in the same manner as in the first embodiment. Then, location data of multiple feature points or markers in which locations are already known in an nth infrared image (n) and an n+1th infrared image (n+1) are acquired. In addition, feature points are extracted from the infrared image (n) and the infrared image (n+1), and correspondence relationships of the feature points between these infrared images are determined. The locations or three-dimensional locations of the multiple feature points contained in both of the two infrared images are already known, and thus, location of the UAV or the infrared camera at the time of obtaining the image (n) in photographing is calculated by a method of resection. Similarly, location of the UAV or the infrared camera at the time of obtaining the image (n+1) in photographing is calculated.

With reference to the locations of the UAV or the infrared camera at the times of obtaining the image (n) and the image (n+1) in photographing, location or a three-dimensional location of the feature point contained in both of the image (n) and the image (n+1), other than the marker for which location is already known, is calculated by a method of intersection.

This process is performed on pairs of successive images such as a pair of the image (n+1) and an image (n+2) and a pair of the image (n+2) and an image (n+3), whereby location of the UAV 100 or the infrared camera 101 that changes with time, and locations of the feature points contained in each of the infrared photographic images, are calculated.

This embodiment is effective in a case in which agricultural land is extensive and includes a site without a maker in which location is not preliminarily determined, and moreover, positioning of the UAV 100 is difficult to perform at this site by using the TS 200. In this situation, location of the UAV 100 in the air above the marker in which location is already known, is measured by using the marker. On the other hand, location of the UAV 100 in the air above a site without a marker for which the location is already known, at each time of obtaining an image in photographing, is measured by tracking feature points between images constituting a stereoscopic image.

3. Third Embodiment

It is desirable to track and monitor a UAV that is flying by any method, from the point of view of safety. Tracking and monitoring can be performed by eye during the daytime, but this method is not practical at night.

The following describes a method of tracking and monitoring a UAV in at night, other than the method of by eye. This process is performed by the PC 210, which is connected to the TS 200 and functions as the tracking determining unit.

In this case, the UAV 100 includes the reflection prism 102. The UAV 100 flies along a predetermined flight path at night, and the location of the reflection prism 102 is tracked by the TS 200 during the flight of the UAV 100. The predetermined flight path and the positioning data of the reflection prism 102, which is obtained by the TS 200, are compared with each other.

The degree of agreement between the predetermined flight path and the flight trajectory of the UAV 100 measured by the TS 200 is evaluated. In the case in which they are presumed to agree with each other, it is determined that the TS 200 tracks and monitors the UAV 100 that flies at night. In the case in which they are presumed to not agree with each other, it is determined that tracking and monitoring of the UAV 100 have failed. In this situation, a process of emergency landing, a process of autonomous flight for making a landing on a specific place, or other process, is performed.

The degree of agreement between the predetermined flight path and the flight trajectory of the UAV 100, which is measured by the TS 200, is evaluated as follows. That is, the predetermined flight path and the flight trajectory of the UAV 100 are presumed to agree with each other in a case in which the difference of position therebetween at a specific time is a predetermined threshold or less. Otherwise, the predetermined flight path and the flight trajectory of the UAV 100 are presumed not to agree with each other in a case in which the difference of position therebetween at a specific time exceeds the predetermined threshold.

On the other hand, the TS 200 includes a camera. Identifying and tracking of the UAV 100 that flies at night can also be performed by photographing using this camera. In this case, the UAV 100 includes a light emitting element. The light emission interval of the light emitting element is determined in advance. The camera of the TS 200 detects light that is emitted by the light emitting element. At this time, the light emission interval is measured, whereby the TS 200 identifies the UAV 100.

In one example, the UAV 100 may include multiple light emitting elements having different wavelengths. In this example, a combination of emitted light having different wavelengths is detected from an image that is obtained by photographing using the camera, whereby the TS 200 identifies the UAV 100. The process relating to these identifications is performed by the PC 210, which functions as the tracking determining unit.

This embodiment provides a method of tracking a UAV having a reflection prism that is flying at night. In this method of tracking a UAV that is flying at night, the UAV is made to fly along a predetermined flight path, and the location of the reflection prism is measured by the total station while the UAV flies. Then, the predetermined flight path and the result of positioning the reflection prism, which is performed by the total station, are compared with each other, whereby success or failure in tracking the UAV is determined. This embodiment can also be used in a case of making a UAV fly at night for purposes other than surveying.

What is claimed is:

1. A method for processing infrared photographic images in a technique for photographing a ground surface from the air at night by using an infrared camera mounted on an unmanned aerial vehicle, the method comprising:
    disposing multiple infrared light emitting points on the ground surface;
    photographing the ground surface multiple times in such a manner as to obtain multiple infrared photographic images in which a part of the ground surface is commonly contained, by using the infrared camera while the unmanned aerial vehicle flies at night; and
    determining a correspondence relationship between the multiple infrared photographic images by using bright points of the infrared light emitting points in the part of the ground surface commonly contained in the multiple infrared photographic images.

2. The method for processing the infrared photographic images according to claim 1, wherein the multiple infrared light emitting points include an infrared light emitting point having an emission wavelength that is different from emission wavelengths of other infrared light emitting points,
    location of at least one of the multiple infrared light emitting points is determined in advance, and
    the infrared light emitting point in which the location is determined in advance and an infrared light emitting point in which location is not determined in advance are distinguished from each other in accordance with difference in the emission wavelength.

3. The method for processing the infrared photographic images according to claim 1, wherein the multiple infrared light emitting points include an infrared light emitting point having an emission wavelength of $\lambda i$ (i=1, 2, 3, . . . ),
    a relationship between the emission wavelength $\lambda i$ and location at which infrared light having the emission wavelength $\lambda i$ is emitted from the infrared light emitting point, is preliminarily determined, and
    in a case in which the infrared light emitting point having the emission wavelength $\lambda i$ is detected in the infrared photographic image, location of the detected infrared light emitting point is identified on a basis of the preliminarily determined relationship.

4. A device for processing infrared photographic images, comprising a processor or circuitry configured to:
    store data of an emission wavelength of a marker that emits infrared light having a specific wavelength and data of a location at which the marker is installed in a surveying target;
    receive data of at least a pair of infrared photographic images that are obtained in such a manner that at least a part of the surveying target is photographed from different positions so as to be contained in both of the infrared photographic images;
    extract multiple feature points including a light emitting point of the marker, from at least the pair of the infrared photographic images;
    detect the light emitting point of the infrared light having the specific wavelength, from among the multiple feature points; and
    acquire location of the light emitting point of the infrared light having the specific wavelength, from the stored data, on a basis of the emission wavelength of the light emitting point that is detected.

5. A method for processing infrared photographic images, comprising:
    storing data of an emission wavelength of a marker that emits infrared light having a specific wavelength and data of location at which the marker is installed in a surveying target;
    receiving data of at least a pair of infrared photographic images that are obtained in such a manner that at least a part of the surveying target is photographed from different positions so as to be commonly contained in both of the infrared photographic images;
    extracting multiple feature points including a light emitting point of the marker, from at least the pair of the infrared photographic images;
    detecting the light emitting point of the infrared light having the specific wavelength, from among the multiple feature points; and
    acquiring location of the light emitting point of the infrared light having the specific wavelength, from the stored data, on a basis of the emission wavelength of the light emitting point that is detected.

6. A non-transitory computer recording medium storing computer executable instructions for processing infrared photographic images, the computer executable instructions made to, when executed by a computer processor, cause the computer processor to:
- store data of an emission wavelength of a marker that emits infrared light having a specific wavelength and data of location at which the marker is installed in a surveying target;
- receive data of at least a pair of infrared photographic images that are obtained in such a manner that at least a part of the surveying target is photographed from different positions so as to be contained in both of the infrared photographic images;
- extract multiple feature points including a light emitting point of the marker, from at least the pair of the infrared photographic images;
- detect the light emitting point of the infrared light having the specific wavelength, from among the multiple feature points; and
- acquire location of the light emitting point of the infrared light having the specific wavelength, from the stored data, on a basis of the emission wavelength of the light emitting point that is detected.

* * * * *